United States Patent [19]
Matzinger

[11] Patent Number: 6,020,397
[45] Date of Patent: Feb. 1, 2000

[54] TWO-COMPONENT INK JET INK SYSTEM

[75] Inventor: Michael D. Matzinger, Mt. Pleasant, S.C.

[73] Assignee: Westvaco Corporation, New York, N.Y.

[21] Appl. No.: 08/948,767

[22] Filed: Oct. 10, 1997

[51] Int. Cl.[7] .............................. B05D 5/06; B32B 27/06
[52] U.S. Cl. ..................... 523/160; 427/287; 427/288; 427/337; 427/340; 427/342; 427/385.5; 427/386; 427/388.1; 427/389.9; 427/391; 427/393.5; 427/394; 428/195
[58] Field of Search .................... 427/287, 288, 427/337, 340, 342, 385.5, 386, 388.1, 389.9, 391, 393.5, 394; 428/195

[56] References Cited

U.S. PATENT DOCUMENTS

| | | | |
|---|---|---|---|
| 4,440,847 | 4/1984 | Whittemore, Jr. | 427/393.5 |
| 4,701,403 | 10/1987 | Miller | 427/340 |
| 4,756,714 | 7/1988 | Hendrix et al. | 427/389.9 |
| 4,960,687 | 10/1990 | Cho | 427/340 |
| 5,208,092 | 5/1993 | Iqbal | 428/195 |
| 5,221,551 | 6/1993 | Saverin et al. | 427/385.5 |
| 5,472,789 | 12/1995 | Iqbal et al. | 428/195 |
| 5,500,253 | 3/1996 | Sanduja et al. | 427/385.5 |
| 5,599,576 | 2/1997 | Orolski | 427/2.3 |
| 5,607,897 | 3/1997 | Masuda | 428/195 |
| 5,665,457 | 9/1997 | Sato et al. | 428/195 |
| 5,702,754 | 12/1997 | Zhons | 427/2.3 |
| 5,707,722 | 1/1998 | Iqbal et al. | 428/195 |
| 5,853,859 | 12/1998 | Leus et al. | 428/196 |

*Primary Examiner*—Peter A. Szekely
*Attorney, Agent, or Firm*—Terry B. McDaniel; Daniel B. Reece, IV; Richard L. Schamlz

[57] ABSTRACT

A printing system consisting of at least two reactive components is disclosed, in which one component is a polymer having attached at least one functional group that is reactive with an aziridine, such as a carboxyl, thiocarboxyl, sulfonic, phosphoric, epoxy, or isocyanate group or derivative thereof, and the other component is an aziridine, which printing system can be used to provide printed images of excellent quality that are wet-rub resistant and accent marker resistant. In addition to using the invention two-component system to produce printed images directly, a method for using the two-component system to develop lithographic printing plates is disclosed.

36 Claims, No Drawings

TWO-COMPONENT INK JET INK SYSTEM

BACKGROUND OF THE INVENTION

1. Field of the Invention

The present invention relates to ink-jet inks. More particularly, the present invention relates to ink-jet inks employed in an ink-jet recording process and an ink-jet recording apparatus.

2. Description of the Related Art (Including Information Disclosed Under 37 CFR 1.97 and 37 CFR 1.98)

Ink jet printing is a non-impact means of generating images by directing small droplets or particles in rapid succession onto the surface of a substrate. There are various possible ways of generating and projecting droplets, but only two main systems appear suited to real production applications.

The first uses a continuous stream of droplets which are electrostatically charged as they leave the nozzle and are deflected in flight by the application of a high voltage to a set of deflector plates. The charge on each individual droplet can be varied so that as the stream passes through the deflector plates, which are maintained at a constant electromagnetic potential, the trajectory of each drop (and hence its point of contact on the substrate) can be accurately controlled.

The other technique is known as "drop-on-demand" or "impulse" printing. The drops are not normally charged or deflected in their travel to the substrate. Thus, a matrix consisting of a bank of nozzles is required to create the image.

The inks used must have physical properties suitable for jet formation and streaming while being capable of producing sharp, dense, and permanent images. In addition, they should be stable on storage and must present no long-term health, or short-term chemical, hazard.

For accurate and consistent drop formation, the inks must possess a careful balance of rheology, surface tension, and (for continuous jet machines) conductivity. Flow should ideally be Newtonian, but viscosity may vary from machine to machine. Impulse jets place more critical requirements on ink viscosity than continuous jets because of their mode of operation which demands that they maintain a stable viscosity during long periods of use. Unfortunately, viscosity varies with temperature; and, for this reason, a number of impulse jet machines incorporate thermostatically controlled nozzles.

Surface tension is also a critical factor in the formation and maintenance of discrete drops. Water, at 72 dynes/cm, would provide the optimum surface tension; but, because it is blended with dyes, resins, and additives, this figure is not achieved. A more approachable figure is 50–60 dynes/cm. Solvent-based inks for continuous drop printers have even lower surface tensions.

In many applications, prints must dry quickly. This does not present too much of a problem with continuous jet printers, as fast drying solvents such as ethanol or methyl ethyl ketone (MEK) can be used. However, an ink based on such fast drying solvents would dry in the nozzles of an impulse jet printer; and, therefore, it is difficult to formulate a true "fast-drying" "drop-on-demand" ink. Most impulse jet inks are based on slow evaporating glycols to minimize evaporation.

Glycol and water based ink-jet inks dry by absorption into the paper. On more absorbent papers, drying will be quicker, but there will be a greater tendency for the ink to spread through the paper fibers giving poor ink definition and strike through. By formulating to the limits of the viscosity and surface tension specifications, it is possible to minimize this problem. Also, it can be avoided, or minimized, by using less absorbent paper.

In the case of non-absorbent surfaces, binder choice is critical. Almost all solvent based ink-jet printing inks contain resinous binders to give key and hardness. Binder resins are selected for their general adhesion and solution properties and include acrylics, polyamides, and maleics.

Most ink systems contain soluble dyes, which give satisfactory color properties for most work. Color strength is limited by the solubility of the dye, but with careful selection ranges of bright strong colors can be produced. Pigments are rarely used, because they present flow, clogging, nozzle wear, and stability problems.

Dye solubility in water tends to be dependent on pH, and ink-jet systems are normally adjusted to be neutral or slightly alkaline. To prevent pH variation due to absorption of carbon dioxide from the atmosphere, such systems may also be buffered with additives such as sodium carbonate. Also, pH can have an effect on the corrosiveness of the ink system in contact with certain metals, and this must be borne in mind when formulating for specific machines. *The Printing Ink Manual* (Fourth Edition, 1988) gives the following as typical ink-jet ink formulations:

TABLE I

Typical Ink Formulations

A. Solvent-based Continuous Jet Ink

| | | |
|---|---|---|
| Aniline Blue | 3.0 | Solvent-soluble dye |
| Phenol-formaldehyde polymer | 6.0 | Film-forming polymer to give resistance and adhesion to substrate |
| Alcohol | 49.5 | Solvent |
| Dimethylformamide | 41.0 | Solvent |
| Soluble electrolytes | 0.5 | Conductivity aid |
| | 100.0 | |

Final characteristics:
Viscosity, 2.1 cp. at 20° C.
Conductivity, 1200 micromhos/cm
Surface tension, 25 dynes/cm at 20° C.

B. Water-based Continuous Jet Ink

| | | |
|---|---|---|
| Direct Black Dye | 4.25 | |
| Distilled Water | 83.15 | |
| Polyethylene Glycol | 5.00 | Crusting Inhibitor |
| N-methylpyrrolidone | 4.00 | Dye Solvent |
| Ethylene Glycol Monobutylether | 3.00 | Paper Penetrant |
| Sequestering Agent | 0.20 | Heavy Metal Suppressor |
| Buffering Agent | 0.30 | pH Control |
| Biocide | 0.10 | Anti-mold |
| | 100.00 | |

Final characteristics:
Viscosity, 2.28 cp. at 20° C.
Conductivity, 11,000 micromhos/cm
Surface tension, 43.5 dynes/cm
pH, 10.3

C. Impulse (Drop-on-Demand) Jet Ink

| | | |
|---|---|---|
| Direct Dyestuff | 3.0 | Soluble Dyestuff |
| Polyethylene Glycol | 14.0 | Anti-clogging Solvent |
| Diethylene Glycol | 12.0 | Humectant |
| N-methylpyrrolidone | 15.0 | Dye Solubiliser |
| Biocide | 0.1 | Anti-fungal |
| Buffering Agents | 0.3 | pH Control |
| Polyvinyl Alcohol | 3.0 | Viscosity Controller |
| Triethanolamine | 1.0 | Surface Tension Controller |
| Distilled Water | 51.6 | Solvent |

TABLE I-continued

Typical Ink Formulations 100.0

Final characteristics:
Viscosity, 9.0 cp. at 20° C.
Surface tension, 45 dynes/cm
pH, 10.5

Typical dyes used in ink-jet ink formulations are disclosed in the following U.S. patents:

| | |
|---|---|
| U.S. Pat. No. 4,761,180 | Dyes Containing Tetramethylammonium Cation for Ink-jet Printing Inks |
| U.S. Pat. No. 4,836,851 | Dyes Containing Polyhydroxyl Groups for Ink-jet Printing Inks |
| U.S. Pat. No. 4,994,110 | Dyes Containing Lithium for Ink-jet Printing Inks |
| U.S. Pat. No. 5,098,474 | Dyes Containing Alkylamino Groups for Ink-jet Printing Inks |

Although dyes, rather than pigments, have been the traditional ink colorant of choice for ink-jet printers for fluidity and anti-clogging requirements, dyes do present several disadvantages. They may smear when brushed by an oily finger. They are water-soluble and remain so after drying. So, they redissolve upon contact with water and will run when exposed to a water spill. Also, dye images smear on contact with felt tip pen markers. Therefore, dyes may make the ink-jet ink exhibit poor color-fastness. In addition, they exhibit poor light stability relative to pigments and are known to fade even under conditions of office fluorescent lighting. Thus, there are several disadvantages with the use of dye-based ink-jet inks, many of which prohibit their use in applications requiring fast drying times and improved light-fastness, or greater light stability.

To improve the color-fastness of ink-jet prints, manufacturers are developing pigment-based inks. U.S. Pat. No. 5,172,133, for example, teaches ink-jet recording with an ink composition containing pigment and a water-soluble resin in specific weigh proportions; and U.S. Pat. No. 5,529,616 teaches a pigment-based ink-jet ink containing particular mixtures of alcohols to achieve desirable surface tension. Due to the low ink viscosity needed for this mode of printing, however, jet inks generally contain relatively low levels of resin. This makes binding of the pigment onto the paper difficult. Weak bonding of pigment to paper results in poor color-fastness, or water-fastness.

A number of methods have been proposed to immobilize the colorant of an ink jet ink on a substrate. Such known methods include metal ion chelating (U.S. Pat. No. 4,694,302), anionic/cationic reactions (U.S. Pat. No. 5,623,294), and polymeric reactions (U.S. Pat. No. 5,629,359).

Problems have been encountered with the practice of the prior art. In practicing the method of metal ion chelating, a restriction exists in that the practice is limited to environments in which the metal ion can exist in a stable form long-term. In practicing the method of anionic/cationic reactions, a restriction exists as to where the anionic or cationic component can be reside because of adverse reactions that can occur, for example, between the component and the colorant in the ink or between the component and an acidic or basic component in the substrate. In practicing the method of polymeric reactions, problems with long-term stability of components can occur, the use of heat or time may be required to achieve polymer formation, or hazardous monomers may be employed. The practice of all three methods can produce printed images that are not resistant to water and accent markers, that have poor print quality, and that have low optical densities.

Therefore, an object of the present invention is to provide recording methods and ink and liquid compositions capable of overcoming the foregoing problems and obtaining a printed image with at least: 1) complete wet (water) rub resistance, 2) complete resistance to accent markers possessing either an acidic or basic pH, 3) sufficient optical density, and 4) excellent quality. Furthermore, the present invention intends to achieve at least five goals with respect to the printing process: 1) substrate independence, 2) fast development of the desired properties of the printed image without the use of heat or excessive time, 3) alternatives as to where the components of the ink and liquid compositions can reside, 4) flexibility as to how the components can be combined, and 5) stability of the components. More particularly, it is an object of the invention disclosed herein to provide a two-component ink-jet printing ink system that provides improvements in water-fastness and wet rub resistance.

SUMMARY OF THE INVENTION

The above objects are achieved in a printing system consisting of at least two reactive components, in which one component is a polymer having attached at least one functional group that is reactive with an aziridine, such as a carboxyl, thiocarboxyl, sulfonic, phosphoric, epoxy, or isocyanate group or derivative thereof, and the other component is an aziridine, which printing system can be used to provide printed images of excellent quality that are wet-rub resistant and accent marker resistant. The composition combinations and the methods by which the combinations are applied to the substrate have been found to influence print quality, optical density, wet-rub resistance, and accent marker resistance when applied to various substrates including, but not limited to, uncoated paper, aluminum, vinyl, and polyethylene. In addition to using the invention two-component system to produce printed images directly, a method for using the two-component system to develop lithographic printing plates is disclosed.

DETAILED DESCRIPTION OF THE PREFERRED EMBODIMENT(S)

Ink and liquid compositions of the present invention utilize at least two reactive components, an aziridine and a polymer or polymers that possess a functional group or groups that can undergo a reaction with the aziridine. These functional groups include, but are not limited to, carboxyl, thiocarboxyl, sulfonic, phosphoric, epoxy, or isocyanate groups or derivatives thereof. The reactive components may be applied to a receiving surface (i.e., substrate) either separately or together. Upon reaction of the reactive components on a receiving surface, a durable, cross-linked polymer is formed which can bind a colorant to the surface and thus provide a printed image that possesses complete wet-rub and accent marker resistance, high optical density, and excellent print quality. Such cross-linked polymer may improve the adhesion of the ink to the receiving surface. Because the aziridine is unreactive at a pH of about 8 or more but is reactive at a pH of about 8 or less, it is possible, by careful control of pH, to achieve alternatives as to where the components of the ink and liquid compositions can reside prior to printing and how the components can be combined, to achieve stability of the two components, and to develop the desired properties of the printed image without the use of heat or excessive time.

Carrier Medium

The ink and liquid compositions employed in the practice of the invention commonly include a carrier medium comprised of at least one of the following components: water, a glycol, and, optionally, an organic solvent. However, it is intended that the teaching of this invention may be applied to other appropriate carrier media, as well. The compositions also may include a colorant (either a dye or pigment or a dye and pigment combination), an aziridine, and a polymer possessing functionality that provides reactivity with an aziridine. The liquid compositions according to the present invention are preferably colorless, and, as such, typically do not contain a colorant. Of course, the ink compositions typically do contain a colorant. Unless otherwise indicated, the amounts of the components of the compositions are given in terms of weight percent (wt. %).

The ink and liquid compositions typically contain at least one glycol that serves as a humectant to prevent drying of the compositions during the printing operation, as well as during storage of the compositions. Glycols suitably employed in the practice of the invention include ethylene glycol, diethylene glycol, triethylene glycol, tetraethylene glycol, propylene glycol, dipropylene glycol, glycerine, and poly(ethylene glycol). Diethylene glycol is the preferred glycol.

Suitable examples of an organic solvent include: alcohols, such as methyl alcohol, ethyl alcohol, n-propyl alcohol, isopropyl alcohol, n-butyl alcohol, sec-butyl alcohol, or tert-butyl alcohol; amides, such as dimethylformamide or dimethylacetamide; carboxylic acids; esters, such as ethyl acetate, ethyl lactate, and ethylene carbonate; ethers, such as tetrahydrofuran or dioxane; glycerine; glycols; glycol esters; glycol ethers; ketones, such as acetone, diacetone, or methyl ethyl ketone; lactams, such as N-isopropyl caprolactam or N-ethyl valerolactam; lactones, such as butyrolactone; organosulfides; sulfones, such as dimethylsulfone; organosulfoxides, such as dimethyl sulfoxide or tetramethylene sulfoxide; and derivatives thereof and mixtures thereof. Among these organic solvents, an alcohol such as ethanol and a glycol such as diethylene glycol are preferred.

Colorant

No particular limitation is imposed on the type or the amount of colorant used. The colorant useful in the present invention may be a pigment, pigment dispersion, or a dye. In the preferred embodiment of the present invention, the colorant is a pigment.

A large range of pigments, organic and inorganic, may be used either alone or in combination. Pigments with acidic or basic functional groups or with polymers on their surface are particularly useful.

When the application involves printing with an ink jet ink printer, the pigment particles need to be small enough in size so that they move freely through the printing device. Because the ejecting nozzles of inkjet ink printers range in diameter from about 10 to 100 microns, pigments suitable for use in the present invention may have a range of particle sizes from about 0.01 microns to 100 microns, preferably from about 0.01 microns to 10 microns, and more preferably from about 0.01 microns to 5 microns.

Where a pigment is employed in the present invention as a coloring agent, the amount of the pigment in the total ink is between 1 to 20%, preferably between 2 to 5%. Examples of a pigment that may be used in the practice of the present invention for a yellow ink include C.I. Pigment Yellow 1, C.I. Pigment Yellow 3, and C.I. Pigment Yellow 13. Examples of a pigment that may be used in the present invention for a magenta ink include C.I. Pigment Red 5, C.I. Pigment Red 7, C.I. Pigment Red 12, C.I. Pigment Red 112, and C.I. Pigment Red 122. Examples of a pigment that may be used in the present invention for a cyan ink include C.I. Pigment Blue 1, C.I. Pigment Blue 2, C.I. Pigment Blue 16, C.I. Vat Blue 4, and C.I. Vat Blue 6. Carbon black may be used as a pigment. Examples of carbon black pigments which are available commercially include ACRYJET Black-357 (Polytribo), BONJET CW-1 (Orient Chemical Corporation), DISPERS Jet Black 1 (BASF), and NOVOFIL Black BB-03 (Hoechst Celanese Corporation).

Other colorants envisioned as being useful in the present invention include any of the acid dyes, direct dyes, food dyes, and reactive dyes described in The Color Index. Dyes which are not described in The Color Index also can be used. Dyes useful in the present invention include anionic, cationic, amphoteric, and non-ionic dyes. Up to 25% of a dye or dyes may be used in the ink.

Fine particles of metal or metal oxides also may be included as colorants for the compositions of the present invention. Metal and metal oxides are used in the preparation of magnetic inkjet inks. Examples may include silica, alumina, titania, and finely divided copper.

In the interest of simplicity, printing using a water-dispersible pigment is provided by way of example; however, the same function can be obtained using other classes and colors of pigments and dyes.

Reactive Components

Aziridines are compounds that possess at least one nitrogen-containing three-membered ring system (aziridinyl group). Preferred aziridines for the present invention include those which have two or more aziridinyl groups. Examples include 2-[3-(1-aziridinyl)propionyloxymethyl]-1,3-bis[3-(2-methyl-1-aziridinyl)propionyloxymethyl]-2-ethylpropane and trimethylolpropane tris(2-methyl-1-aziridinepropionate). The aziridine component may be used in amounts from 0.1% to 20%.

The polymers employed in the present invention must be reactive with the aziridine. Suitable polymers may include polymers that possess at least one carboxyl, thiocarbonyl, sulfonic, phosphoric, epoxy, or isocyanate group or derivative thereof. Polymers that possess at least one carboxyl group are preferred. No particular limitation is imposed on the physical properties of the polymers. Preferred carboxyl-functionalized polymers are those having an acid number in the range of about 10 to 300, a weight average molecular weight in the range of about 500 to 100,000, a softening point in the range of from about 25 to 150° C., and a glass transition temperature of less than 150° C. More preferred carboxyl-functionalized polymers are those having an acid number in the range of about 40 to 220, a weight average molecular weight in the range of about 1000 to 20,000, a softening point in the range of from about 25 to 90° C., and a glass transition temperature of less than 90° C.

The polymers suitable for use in the present inventions may include, but are not limited to, water soluble or insoluble polymers and water dispersible and non-dispersible polymers. Examples include naturally occurring polymers such as alginic acid, carboxymethyl cellulose, and pectinic acid; synthetic homopolymers such as polyacrylic acid, polymethacrylic acid, polyitaconic acid, and polymaleic acid; and synthetic copolymers such as styrene/acrylic acid copolymers and acrylic acid/N-vinyl pyrrolidinone copolymers.

Any suitable amount of the polymer can be used. The polymer is used preferably in an amount in the range from about 1% to 25%, more preferably in the range from about 2% to 8%.

For applications where solubility or dispersibility of the polymer in water is desired, the pH of the polymer-containing solution can be adjusted to be either neutral or alkali. Examples of a pH adjuster include an organic amine, such as diethanolamine or triethanolamine; an inorganic alkali, such as sodium hydroxide, lithium hydroxide, or potassium hydroxide; an organic acid; and a mineral acid. The amount of pH adjuster used may be preferably within a range of from about 5 to 100% based on the weight of the polymer. A pH buffer, such a lithium acetate, or 2-(N-morpholino) ethanesulfonic acid, also may be added.

Other Components

In addition to the above described components, the ink and liquid compositions employed in the present invention may contain biocides, defoamers, sequestering agents, and surfactants, if required or desired. Other components are not excluded.

One or more biocides may be incorporated, in an amount of from about 0.001% to 4%, to prevent the growth of microorganisms. Examples of such biocides include PROXEL® GXL (polycyclic heteronuceararomatic biocide, Zeneca Corp.).

One or more defoamers effective in preventing the foaming of an ink or liquid composition can be used, preferably in the range from about 0.01% to 1%, and more preferably in the range from about 0.05% to 0.1%. Suitable defoamers include silicone defoamers and acetylenic defoamers. Examples of silicone defoamers include DC-150 (Dow Corning Co.) and SILVET 720 (Union Carbide Co.). An example of an acetylenic defoamer includes SURFONYL 104 PG50 (Air Products and Chemical Co.).

One or more sequestering agents may be used to prevent the deleterious efforts of heavy metals. Examples include sodium ethylene diamine tetraacetate, sodium nitrilotriacetate, sodium hydroxyethyl ethylene diamine triacetate, sodium diethylene triamine pentaacetate, and sodium uramil diacetate.

One or more surfactants, typically about 0.01%, may be added to improve the wettability of the ink and liquid compositions on the reactive surface. Examples of such wetting agents include ATLAS® (cationic ether sulfate surfactant, ICI Americas) and FLUORAD FC 430 (fluoroaliphatic polymer ester coating additive, 3M Company). Selection of the surfactants is particularly important in terms of adjusting the permeability of the compositions into the recording medium.

Printing Methods

The present invention can be practiced with any image-forming method as long as a state is achieved in which the reactive components coexist on the recording medium. There is no limitation placed on the time interval between the application of the liquid compositions and the application of the ink composition to the recording medium. The ink may be applied almost concurrently with or before or after application of the liquid compositions to the recording medium.

The non-colorant-containing liquid compositions may be applied to the entire surface of the recording medium such as by spraying or by a roller. A more preferable method for applying the liquid compositions is to apply the non-colorant-containing compositions only to the image forming area to which the ink compositions have been or will be attached. In this later cases, an ink jet recording method can be used of the type in which the liquid is discharged using a bubble generated by heat energy (thermal ink jet), by a pressure wave (piezo ink jet), or by a pulse of a gas (value jet). The preferred method for applying the colorant-containing ink compositions is by an on-demand or continuous thermal or piezo ink jet printer.

Substrates

There is no limitation placed on the recording medium used in conjunction with the above printing methods. Any suitable substrate can be employed, including conventional cellulosic papers such as copying paper and bond paper, silica coated papers, glass, aluminum, rubber, vinyl, fabrics, textile products, plastics, polymeric films, inorganic substrates such as metals and woods, and the like. In a preferred embodiment, the recording medium is a porous or absorbent substrate, such as uncoated paper.

The surface tension of the ink and liquid compositions was measured using a SENSADYNE® 6000 Surface Tensiometer from Chem-Dyne Research Corporation and viscosity was measured using a No. 1 Shell cup from Norcross Corporation.

In the examples to follow, the optical density of printed images, prepared either by using a Hewlett Packard HP 855CSe thermal ink jet ink printer or by using a No. 8 wire coating rod from RD Specialties, was measured using a X-Rite® 418 Color Reflection Densitometer from X-RITE®, Incorporated. The print quality of printed images was determined by visual observation.

Wet-rub resistance was established by placing 0.5 mL of distilled water on the printed image and then rubbing the print with a finger. The loss of colorant was determined visually. Accent marker resistance was established by drawing an acidic or basic accent marker across the printed image. The transfer of colorant to the marker and to the non-image area of the print was determined visually.

EXAMPLE 1

Example 1 discloses an ink composition consisting of a colorant, an aziridine, and an ink vehicle jetted with an ink jet printer onto a substrate that contained on its surface a carboxylic acid-functionalized polymer.

The ink composition components of Table I were mixed and then filtered under pressure using a membrane filter having a pore size of 0.45 $\mu$m (ACRODISC® CR PTFE, supplied by Gelman Sciences) to give ink composition 7533-37B. The composition possessed a pH of 10.2, a viscosity of 2.6 cP, and a surface tension of 70.3 dynes/cm.

TABLE I

Ink Composition 7533-37B

| Component | Amount, % |
|---|---|
| Deionized water | 74 |
| LIPONIC ® EG-1* | 10 |
| Ethylene glycol | 10 |
| BONJET ® CW-1 | 5 |

TABLE I-continued

Ink Composition 7533-37B

| Component | Amount, % |
|---|---|
| IONAC ® PFAZ-322** | 1 |

*ethoxylated glycerol, Lipo Chemical.
**polyaziridine coating additive, Akzo Nobel.

The carboxylic acid-functionalized polymer liquid composition 7533-36E was prepared by mixing the components of Table II and then adjusting the pH to 9.1 with ammonium hydroxide. The composition had a viscosity of 4.0 cP and a surface tension of 39.6 dynes/cm.

TABLE II

Liquid Composition 7533-36E

| Component | Amount, % |
|---|---|
| Deionized water | 74.9 |
| LIPONIC ® EG-1 | 10 |
| Ethylene glycol | 10 |
| Polymer 7490-71[a] | 5 |
| SURFONYL ® 104PG-50 | 0.1 |

[a]Polymer 7490-71 is a styrene/acrylic acid, butyl polymer that has a softening point of 60° C., an acid number of 149, a weight average molecular weight of 3650, and a glass transition temperature of 5° C.

Liquid composition 7533-36E was drawn down onto uncoated paper (Nashua Dataprint Dual-Purpose Xerographic Bond, Nashua Office Products) with a No. 8 wire coating rod (RD Specialties). Ink composition 7533-37B was printed with a Hewlett Packard HP 855 Cse thermal ink jet printer onto the paper treated with liquid composition 7533-36E. The resulting printed image possessed wet-rub resistance, accent marker resistance, and print quality properties superior to those of a printed image made by printing ink composition 7533-37B on the uncoated paper that had not been treated with liquid composition 7533-36E. A similar printed image was obtained by using the ink jet printer to deliver liquid composition 7533-36E from one cartridge of the printer onto the paper prior to delivering ink 7533-37B from a second cartridge of the printer.

EXAMPLE 2

This example discloses an ink composition comprised of a colorant, a carboxylic-acid functionalized polymer, and an ink vehicle jetted with an ink jet printer onto a substrate that contained an aziridine.

The ink composition components of Table III were mixed and filtered under pressure using a membrane filter having a pore size of 0.45 μm to give ink composition 7533-35C. The pH of the composition was adjusted to 9.4 by the addition of ammonium hydroxide. The ink possessed a viscosity of 5.5 cP and a surface tension of 43.6 dynes/cm.

TABLE III

Ink Composition 7533-35C

| Component | Amount, % |
|---|---|
| Deionized water | 69.9 |
| LIPONIC ® EG-1 | 10 |
| Ethylene glycol | 10 |
| BONJET ® CW-1 | 5 |

TABLE III-continued

Ink Composition 7533-35C

| Component | Amount, % |
|---|---|
| Polymer 7490-71 | 5 |
| SURFONYL ® 104PG50 | 0.1 |

The aziridine liquid composition 7533-35D was prepared by mixing the components of Table IV and then adjusting the pH to 7.9 with ammonium hydroxide. The composition had a viscosity of 1.3 cP and a surface tension of 59.7 dynes/cm.

TABLE IV

Liquid Composition 7533-35D

| Component | Amount, % |
|---|---|
| Deionized water | 98 |
| IONAC ® PFAZ-322 | 2 |

Liquid composition 7533-35D was drawn down on uncoated paper (Nashua Dataprint Dual-Purpose Xerographic Bond, Nashua Office Products) with a No. 8 wire coating rod (RD Specialties). Ink composition 7533-35C was jetted onto the paper treated with liquid composition 7533-35D. The resulting printed image possessed wet-rub resistance, accent marker resistance, and print quality properties superior to those of a printed image made by printing ink composition 7533-35C on the uncoated paper that had not been treated with liquid composition 7533-35D.

EXAMPLE 3

Printed images were obtained by combining on a substrate an ink composition comprised of a colorant and an ink vehicle, a liquid composition comprised of a carboxylic acid-functionalized polymer and an ink vehicle, and a liquid composition comprised of an aziridine and an ink vehicle.

The ink composition components of Table V were mixed and filtered under pressure using a membrane filter having a pore size of 0.45 μm to give ink composition 7533-36D. The pH of the ink composition was adjusted to 10.1 by the addition of ammonium hydroxide. The ink composition possessed a viscosity of 2.6 cP and a surface tension of 71.6 dynes/cm.

TABLE V

Ink Composition 7533-36D

| Component | Amount, % |
|---|---|
| Deionized water | 75 |
| LIPONIC ® EG-1 | 10 |
| Ethylene glycol | 10 |
| BONJET ® CW-1 | 5 |

The effect of the order of addition of the ink and liquid compositions on the optical density, wet-rub resistance, and print quality of the printed image was determined. Table VI summarizes the results of jetting the aziridine liquid composition 7533-35D, ink composition 7533-36D, and the carboxylic acid-functionalized liquid composition 7533-36E onto uncoated paper (Nashua Dataprint Dual-Purpose Xerographic Bond, Nashua Office Products). Wet-rub resistance values were accessed visually using a 1 to 10 scale, where 10 indicated complete resistance. Ink composition 7533-

36D was printed on paper without liquid compositions 7533-35D and 7533-36E to demonstrate the improvement in the wet-rub resistance of the printed image when the three compositions are combined. When the aziridine liquid composition 7533-35D was the last composition placed upon the paper, the print quality was fuzzy. This was confirmed by printing ink composition 7533-35D onto paper coated with liquid composition 7533-36D.

TABLE VI

Made with Compositions 7533-35D (1), 7533-36D (2), and 7533-36E (3)

| Order of Addition (First/Middle/Last) | Optical Density | Wet-Rub Resistance | Print Quality |
| --- | --- | --- | --- |
| 1/3 | 1.28 | 6 | good |
| 2/3/1 | 1.26 | 8 | fuzzy |
| 3/1/2 | 1.27 | 8 | good |
| 1/3/2 | 1.17 | 7 | good |
| 2/1/3 | 1.32 | 8 | good |
| 3/2/1 | 1.34 | 9 | fuzzy |
| 2 | 1.29 | 5 | good |
| 2/1 | 1.30 | 8 | fuzzy |

EXAMPLE 4

An ink composition comprised of a colorant, an aziridine, a carbonyl-functionalized polymer, and an ink vehicle was printed with an ink jet printer onto a substrate.

The ink composition components of Table VII were mixed and filtered under pressure using a membrane filter having a pore size of 0.45 μm to give ink composition 7533-37D. The pH of the composition was adjusted to 9.6 with the addition of ammonium hydroxide. The composition possessed a viscosity of 10 cP and a surface tension of 40.5 dynes/cm.

TABLE VII

Ink Composition 7533-37D

| Component | Amount, % |
| --- | --- |
| Deionized water | 68.9 |
| LIPONIC ® EG-1 | 10 |
| Ethylene glycol | 10 |
| BONJET ® CW-1 | 5 |
| Polymer 7490-71 | 5 |
| IONAC ® PFAZ-322 | 1 |
| SURFONYL ® 104PG50 | 0.1 |

Ink composition 7533-37D was jetted onto uncoated paper (Nashua Dataprint Dual-Purpose Xerographic Bond, Nashua Office Products). The resulting printed image possessed excellent wet-rub resistance, accent marker resistance, and print quality properties. By this method, a printed image with a high optical density, 1.46, was obtained.

EXAMPLE 5

A liquid composition comprising an aziridine and a carboxylic acid-functionalized polymer and an ink composition comprised of a colorant and an ink vehicle were printed onto a substrate.

Liquid composition 7533-37C was prepared by mixing the components of Table VIII and then adjusting the pH to 9.1 with ammonium hydroxide. The composition had a viscosity of 4.1 cP and a surface tension of 39.5 dynes/cm.

TABLE VIII

Liquid Composition 7533-37C

| Component | Amount, % |
| --- | --- |
| Deionized water | 73.9 |
| LIPONIC ® EG-1 | 10 |
| Ethylene glycol | 10 |
| Polymer 7490-71 | 5 |
| IONAC ® PFAZ-322 | 1 |
| SURFONYL ® 104PG-50 | 0.1 |

Ink composition 7533-36D was jetted onto uncoated paper (Nashua Dataprint Dual-Purpose Xerographic Bond, Nashua Office Products). Then, aziridine liquid composition 7533-37C was jetted onto the printed image. The resulting print was wet-rub and accent marker resistant and possessed good print quality.

EXAMPLE 6

A print was made by applying an ink composition comprised of a colorant, an aziridine, and an ink vehicle to a substrate.

Ink composition 7533-37B was jetted onto uncoated paper (Nashua Dataprint Dual-Purpose Xerographic Bond, Nashua Office Products). The resulting print possessed good print quality. The optical density of the printed image was 1.39.

EXAMPLE 7

A print was made by applying an ink composition comprised of a colorant, an aziridine, an ink vehicle, and a carboxylic acid-functionalized polymer to a substrate.

The components of Table IX were mixed and filtered under pressure using a membrane filter having a pore size of 0.45 μm to give ink composition 7533-37D. The pH of the composition was adjusted to 9.6 with the addition of ammonium hydroxide. The ink possessed a viscosity of 10 cP and a surface tension of 40.5 dynes/cm.

TABLE IX

Ink Composition 7533-37D

| Component | Amount, % |
| --- | --- |
| Deionized water | 68.9 |
| LIPONIC ® EG-1 | 10 |
| Ethylene glycol | 10 |
| BONJET ® CW-1 | 5 |
| Polymer 7490-71 | 5 |
| IONAC ® PFAZ-322 | 1 |
| SURFONYL ® O4PG-50 | 0.1 |

Ink composition 7533-37D was jetted onto uncoated paper (Nashua Dataprint Dual-Purpose Xerographic Bond, Nashua Office Products). The resulting printed image possessed excellent wet-rub resistance, accent marker resistance, and print quality properties. By this method, a printed image with a high optical density, 1.46, was obtained.

Ink composition 7533-37D was drawn down with a No. 8 wire coating rod (RD Specialties) onto aluminum foil (Reynolds Metals Company). A printed image with an optical density of 2.2 and excellent print quality was obtained.

Ink composition 7533-37D was drawn down with a No. 8 wire coating rod (RD Specialties) onto vinyl (Sign It Quick Incorporated). A printed image with an optical density of 2.2 and excellent print quality was obtained.

Ink composition 7533-37D was drawn down with a No. 8 wire coating rod (RD Specialties) onto polyethylene (LK Plastics Incorporated). A printed image with an optical density of 2.2 and excellent print quality was obtained.

EXAMPLE 8

Printed images were obtained by combining on a substrate an ink composition comprised of a colorant and an ink vehicle, a liquid composition comprised of a carboxylic-acid functionalized polymer and an non-aqueous-containing ink vehicle, and a liquid composition comprised of an aziridine and an ink vehicle.

Carboxylic acid-functionalized polymer liquid composition 7533-41D was prepared by mixing the components of Table X and then adjusting the pH to 9.4 with ammonium hydroxide. The composition had a viscosity of 10 cP and a surface tension of 29.3 dynes/cm.

TABLE X

Liquid Composition 7533-41D

| Component | Amount, % |
|---|---|
| Ethanol | 45 |
| LIPONIC ® EG-1 | 25 |
| Ethylene glycol | 25 |
| Polymer 7490-71 | 5 |

The effect of the order of addition of the ink and liquid compositions on the optical density, wet-rub resistance, and print quality of the printed image was determined. Table XI summarizes the results of printing aziridine liquid composition 7533-35D, ink composition 7533-36D, and the carboxylic acid-functionalized polymer liquid composition 7533-41D onto uncoated paper (Nashua Dataprint Dual-Purpose Xerographic Bond, Nashua Office Products).

TABLE XI

Prints Made with Compositions
7533-35D (1), 7533-36D (2), and 7533-41D (5)

| Order of Addition (First/Middle/Last) | Optical Density | Wet-Rub Resistance | Print Quality |
|---|---|---|---|
| 1/5 | 1.22 | 7 | good |
| 2/5/1 | 1.34 | 8 | fuzzy |
| 5/1/2 | 1.29 | 7 | good |
| 1/5/2 | 1.15 | 7 | good |
| 2/1/5 | 1.27 | 8 | good |
| 5/2/1 | 1.32 | 8 | fuzzy |

Wet-rub resistance was accessed visually using a 1 to 10 scale, where 10 indicated complete resistance. As noted also in Example 3, when liquid composition 7533-35D was the last composition placed upon the paper, the print quality was fuzzy.

EXAMPLE 9

Printed images were obtained by combining on a substrate an ink composition comprised of a colorant (dye) and an ink vehicle, a liquid composition comprised of a carboxylic-acid functionalized polymer and an non-aqueous-containing ink vehicle, and a liquid composition comprised of an aziridine and an ink vehicle.

Liquid composition 7533-46A was prepared by mixing the components of Table XII and then adjusting the pH to 8.8 with ammonium hydroxide. The composition had a viscosity of 2 cP and a surface tension of 32.7 dynes/cm.

TABLE XII

Liquid Composition 7533-46A

| Component | Amount, % |
|---|---|
| Deionized Water | 78.69 |
| LIPONIC ® EG-1 | 10 |
| Ethylene glycol | 10 |
| Nigrosin Dye | 1 |
| SURFONYL ® 105 PG50 | 0.1 |
| DOWICIL ® 75* | 0.1 |
| EDTA | 0.01 |
| WESTVACO DIACID ® MT-67** | 0.1 |

*cyclic aromatic biocide, The Dow Chemical Company.
**tall oil fatty acid, Westvaco Corporation.

The effect of the order of addition of the ink and liquid compositions on the optical density, wet-rub resistance, accent marker resistance, and print quality of the printer image was determined. Table XII summarizes the results of printing aziridine liquid composition 7533-35D, ink composition 7533-46A, and carboxylic acid-functionalized liquid composition 7533-41D onto uncoated paper (Nashua Dataprint Dual-Purpose Xerographic Bond, Nashua Office Products).

TABLE XIII

Prints Made with Compositions
7533-35D (1), 7533-46A (6), and 7533-41D (5)

| Order of Addition (First/Middle/Last) | Optical Density | Wet-Rub Resistance | Accent Marker Resistance | Print Quality |
|---|---|---|---|---|
| 1/6/5 | 0.77 | 8.5 | yes | good |
| 6/5/1 | 0.69 | 9 | yes | fuzzy |
| 5/1/6 | 0.79 | 8.5 | yes | good |
| 1/5/6 | 0.76 | 8.5 | yes | good |
| 6/1/5 | 0.73 | 8 | yes | good |
| 5/6/1 | 0.71 | 9 | yes | fuzzy |

Wet-rub and accent marker resistance were accessed visually using a 1 to 10 scale, where 10 indicated complete resistance. Again, when aziridine liquid composition 7533-35D was the last composition placed upon the paper, the print quality was fuzzy.

EXAMPLE 10

A plate suitable for lithographic printing was prepared by 1) coating a glass plate with a composition consisting of a colorant, a carboxylic acid-functionalized polymer, a catalyst, and an ink vehicle, 2) printing an image with a composition consisting of an aziridine and an ink vehicle, and 3) washing the plate with a dilute polyvinyl pyrrolidinone solution to remove the composition that was not printed upon.

Liquid composition 7533-49D was prepared by mixing the components of Table XIV and then adjusting the pH to 9.7 with ammonium hydroxide. The composition had a viscosity of 4.2 cP and a surface tension of 39.4 dynes/cm.

TABLE XIV

Liquid Composition 7533-49D

| Component | Amount, % |
|---|---|
| Deionized water | 67.9 |
| Ethanol | 10 |
| Ethylene glycol | 10 |
| Polymer 7490-71 | 10 |
| Zinc ammonium carbonate | 1 |
| SURFONYL® 104PG50 | 0.1 |
| BONJET® CW-1 | 1 |

Liquid composition 7533-49D was drawn down with a No. 8 wire coating rod (RD Specialties) on a glass plate. A pattern was placed upon the resulting coating with liquid composition 7533-35D. After drying, the plate was washed with a 5% aqueous solution of polyvinyl pyrrolidinone. The coating that did not come in contact with liquid composition 7533-35D was removed and the pattern on the glass remained. The pattern was removed by scrubbing the plate with steel wool such that the plate could be reused. In addition to mechanical removal of the pattern, chemical-mediated removal is possible.

While the invention has been described above with reference to the specific embodiments thereof, it will be apparent to skilled persons that many changes, modifications, and variations may be made to the details of the invention described herein without departing from the underlying principles of the inventive concept disclosed. For example, it should be noted that with suitable conductive additives, the formulations contained in the above examples may be used for continuous ink-jet printing. Any non-corrosive, water-soluble salt may be used at a concentration from about 0.001% to about 0.5%. Lower alkyl ammonium chlorides are typical examples.

Also, it is possible that a catalyst or catalysts could be employed to accelerate the reaction between the components of the two-component system. Preferred catalysts are those that are acidic in nature or that contain a metal such as zirconium or zinc.

Further definition of the invention is provided in the following claims.

What is claimed is:

1. An ink jet printing process comprising sequentially applying to a substrate a first liquid composition comprising an aziridine and second liquid composition comprising a polymer having a functional group reactive with the aziridine, said polymer being characterized by a weight average molecular weight of about 1,000 to 20,000.

2. The inkjet printing process of claim 1 wherein the substrate is selected from the group consisting of cellulosic papers, silica coated papers, glass, metals, rubber, vinyl, fabrics, textile products, plastics, and polymeric films.

3. The inkjet printing process of claim 2 wherein the metal is aluminum.

4. The inkjet printing process of claim 2 wherein the cellulosic papers are selected from the group consisting of copying paper and bond paper.

5. The inkjet printing process of claim 1 wherein the liquid composition further comprises a carrier medium.

6. The inkjet printing process of claim 5 wherein the carrier medium is selected from the group consisting of water, organic solvents, and mixtures thereof.

7. The inkjet printing process of claim 6 wherein the carrier medium is water.

8. The ink jet printing process of claim 6 wherein the carrier medium is an organic solvent selected from the group consisting of an alcohol, an amide, a carboxylic acid, an ester, a glycerine, a glycol, a glycol ester, a glycol ether, a ketone, a lactam, a lactone, an organosulfide, a sulfone, an organosulfone, and mixtures thereof.

9. The inkjet printing process of claim 8 wherein the glycol is selected from the group consisting of ethylene glycol, diethylene glycol, triethylene glycol, tetraethylene glycol, propylene glycol, dipropylene glycol, glycerine, and poly(ethylene glycol).

10. The inkjet printing process of claim 8 wherein the alcohol is selected from the group consisting of methyl alcohol, ethyl alcohol, n-propyl alcohol, isopropyl alcohol, n-butyl alcohol, sec-butyl alcohol, and tert-butyl alcohol.

11. The inkjet printing process of claim 8 wherein the amide is selected from the group consisting of dimethylformamide, and dimethylacetamide.

12. The inkjet printing process of claim 8 wherein the ester is selected from the group consisting of tetrahydrofuran and dioxane.

13. The inkjet printing process of claim 8 wherein the ketone is selected from the group consisting of acetone, diacetone, and methyl ethyl ketone.

14. The inkjet printing process of claim 8 wherein the lactam is selected from the group consisting of N-isopropyl caprolactam and N-ethyl valerolactam.

15. The inkjet printing process of claim 8 wherein the lactone is butyrolactone.

16. The inkjet printing process of claim 8 wherein the sulfone is dimethylsulfone.

17. The inkjet printing process of claim 8 wherein the organosulfoxide is selected from the group consisting of dimethyl sulfoxide and tetramethylene sulfoxide.

18. The ink jet printing process of claim 1 wherein the first liquid composition is an ink composition further comprising a colorant.

19. The printing system of claim 18 wherein the colorant is selected from the group consisting of a dye and fine particles of 0.01–100 microns of pigments, pigment dispersions, metals or metal oxides.

20. The inkjet printing process of claim 19 wherein the pigment is present in an amount of from about 1–20%, by weight, of the ink composition, exhibit a particle size from about 0.01–100 microns, and is selected from the group consisting of C.I. Pigment Yellow 1, C.I. Pigment Yellow 3, C.I. Pigment Yellow 13, C.I. Pigment Red 5, C.I. Pigment Red 7, C.I. Pigment Red 12, C.I. Pigment Red 112, C.I. Pigment Red 122, C.I. Pigment Blue 1, C.I. Pigment Blue 2, C.I. Pigment Blue 16, C.I. Vat Blue 4, C.I. Vat Blue 6, and carbon black.

21. The inkjet printing process of claim 20 wherein the pigment exhibits a particle size from about 0.01–10 microns.

22. The inkjet printing process of claim 21 wherein the pigment exhibits a particle size from about 0.01–5 microns.

23. The inkjet printing process of claim 19 wherein the dye is present in an amount of from about 0.5–25%, by weight, and is selected from the group consisting of acid dyes, direct dyes, food dyes, and reactive dyes.

24. The ink jet printing process of claim 19 wherein the dye is present in an amount of from about 0.5–25%, by weight, and is selected from the group consisting of anionic dyes, cationic dyes, amphoteric dyes, and non-ionic dyes.

25. The inkjet printing process of claim 1 wherein the aziridine comprises multiple aziridinyl groups and is present in an amount from about 0.1–20%, by weight.

26. The inkjet printing process of claim 25 wherein the aziridine is selected from the group consisting of 2-[3-(1-aziridinyl)propionyloxymethyl]-1,3-bis[3-(2-methyl-1- aziridinyl)propionyloxymethyl]-2-ethylpropane and trimethylolpropane tris(2-methyl-1-aziridineproprionate).

27. The ink jet printing process of claim 1 wherein the polymer is present in an amount of about 1–25% and comprises a functional group selected from the group consisting of a carboxyl group, a thiocarbonyl group, a sulfonic group, a phosphoric group, an epoxy group, and an isocyanate group.

28. The ink jet printing of claim 27 wherein the polymer is a carboxyl-functionalized polymer exhibiting an acid number of about 10–300, a softening point of about 25–90° C., and a glass transition temperature of less than 90° C.

29. The inkjet printing process of claim 27 wherein the polymer is selected from the group consisting of water-soluble polymers, water-insoluble polymers, water-dispersible polymers, and water-nondispersible polymers.

30. The inkjet printing process of claim 27 wherein the polymer is selected from the group consisting of a naturally occurring polymer and a synthetic polymer.

31. The inkjet printing process of claim 30 wherein the naturally occurring polymers are selected from the group consisting of alginic acid, carboxymethyl cellulose, and pectinic acid.

32. The inkjet printing process of claim 30 wherein the synthetic polymer is selected from the group of homopolymers and copolymers.

33. The inkjet printing process of claim 32 wherein the synthetic polymer is a homopolymer selected from the group consisting of polyacrylic acid, polymethacrylic acid, polyitaconic acid, and polymaleic acid.

34. The inkjet printing process of claim 32 wherein the synthetic polymer is a copolymer selected from the group consisting of styrene/acrylic acid copolymers and acrylic acid/N-vinyl pyrrolidinone copolymers.

35. The inkjet printing process of claim 27 wherein the polymer is present in an amount of about 2–8%.

36. The inkjet printing process of claim 1 further comprising additives selected from the group consisting of a biocide, a defoamer, a sequestering agent, a surfactant, and combinations thereof.

* * * * *